United States Patent
Yoon et al.

(10) Patent No.: US 12,388,156 B2
(45) Date of Patent: Aug. 12, 2025

(54) ASSEMBLY MANUFACTURING EQUIPMENT AND METHOD FOR ELECTRODE ASSEMBLY

(71) Applicant: LG Energy Solution, Ltd., Seoul (KR)

(72) Inventors: Se Hyun Yoon, Daejeon (KR); Chun Ho Kwon, Daejeon (KR); Beomsu Kim, Daejeon (KR); Haksoo Lee, Daejeon (KR); Hyeon Woo Jang, Daejeon (KR); Yong Nam Kim, Daejeon (KR); Dong Hyeuk Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/860,688

(22) Filed: Jul. 8, 2022

(65) Prior Publication Data
US 2023/0028439 A1    Jan. 26, 2023

(30) Foreign Application Priority Data

Jul. 9, 2021    (KR) .................. 10-2021-0090588
Jul. 9, 2021    (KR) .................. 10-2021-0090589
(Continued)

(51) Int. Cl.
*B32B 41/00*    (2006.01)
*H01M 4/04*    (2006.01)
(Continued)

(52) U.S. Cl.
CPC ........... *H01M 50/46* (2021.01); *H01M 4/043* (2013.01); *H01M 4/0471* (2013.01);
(Continued)

(58) Field of Classification Search
CPC ............. H01M 10/0468; H01M 4/043; H01M 4/0471; H01M 10/0404; H01M 10/0431;
(Continued)

(56) References Cited

U.S. PATENT DOCUMENTS 9,209,491 B2    12/2015    Kim et al.
9,793,535 B2    10/2017    Yu et al.
(Continued)

FOREIGN PATENT DOCUMENTS

CN    002763997 Y    3/2006
CN    210403945 U    4/2020
(Continued)

OTHER PUBLICATIONS

International Search Report for Application No. PCT/KR2022/010010 dated Oct. 28, 2022, pp. 1-3.
(Continued)

*Primary Examiner* — Michael N Orlando
*Assistant Examiner* — Joshel Rivera
(74) *Attorney, Agent, or Firm* — Lerner David LLP

(57) ABSTRACT

An electrode assembly manufacturing apparatus includes a stack table, a separator supply unit, first and second electrode supply units, and a side sealing device. A stack of a first electrode, a second electrode, and a separator between the first and the second electrode are stackable on the stack table. The separator supply unit is configured for supplying the separator to the stack table. The first electrode supply unit is configured for stacking the first electrode on a section of the separator on the stack table. The second electrode supply unit stacks the second electrode on a further section of the separator on the first electrode. A side sealing device heats at least one side surface of the stack.

17 Claims, 7 Drawing Sheets

(30) Foreign Application Priority Data

| Jul. 9, 2021 | (KR) | 10-2021-0090590 |
| Jul. 9, 2021 | (KR) | 10-2021-0090591 |
| Jul. 9, 2021 | (KR) | 10-2021-0090592 |
| Jul. 9, 2021 | (KR) | 10-2021-0090596 |
| Jul. 9, 2021 | (KR) | 10-2021-0090597 |
| Jul. 9, 2021 | (KR) | 10-2021-0090598 |
| Jul. 9, 2021 | (KR) | 10-2021-0090600 |
| Jul. 9, 2021 | (KR) | 10-2021-0090601 |

(51) Int. Cl.

| *H01M 10/04* | (2006.01) |
| *H01M 10/0583* | (2010.01) |
| *H01M 50/46* | (2021.01) |
| *H01M 50/463* | (2021.01) |
| *H01M 50/466* | (2021.01) |
| *H01M 10/0525* | (2010.01) |

(52) U.S. Cl.
CPC ... *H01M 10/0404* (2013.01); *H01M 10/0431* (2013.01); *H01M 10/045* (2013.01); *H01M 10/0459* (2013.01); *H01M 10/0468* (2013.01); *H01M 10/0583* (2013.01); *H01M 50/463* (2021.01); *H01M 50/466* (2021.01); *H01M 10/0525* (2013.01)

(58) Field of Classification Search
CPC ......... H01M 10/045; H01M 10/0459; H01M 10/0525; H01M 10/0583; H01M 50/46; H01M 50/463; H01M 50/466; Y02E 60/10; Y02P 70/50
USPC ............. 156/60, 64, 350, 351, 378, 379
See application file for complete search history.

(56) References Cited

U.S. PATENT DOCUMENTS

| 10,333,126 | B2 | 6/2019 | Joo et al. |
| 10,985,356 | B2 | 4/2021 | Joo et al. |
| 2004/0180250 | A1 | 9/2004 | Nanaumi et al. |
| 2005/0186479 | A1 | 8/2005 | Totsuka et al. |
| 2006/0019154 | A1 | 1/2006 | Imachi et al. |
| 2007/0202394 | A1 | 8/2007 | Viavattine |
| 2008/0280208 | A1 | 11/2008 | Naoi et al. |
| 2009/0029259 | A1 | 1/2009 | Okazaki et al. |
| 2009/0136844 | A1 | 5/2009 | Watanabe et al. |
| 2010/0167176 | A1* | 7/2010 | Kawai ............. H01M 4/8896 156/60 |
| 2011/0052964 | A1 | 3/2011 | Kim et al. |
| 2011/0104550 | A1 | 5/2011 | Ahn et al. |
| 2013/0306237 | A1 | 11/2013 | Nagasaka et al. |
| 2014/0050958 | A1 | 2/2014 | Kwon et al. |
| 2014/0205879 | A1 | 7/2014 | Jang et al. |
| 2015/0033527 | A1 | 2/2015 | Park et al. |
| 2015/0162638 | A1 | 6/2015 | Bernini et al. |
| 2015/0180082 | A1* | 6/2015 | Jung ................. H01M 10/0459 429/246 |
| 2015/0188108 | A1 | 7/2015 | Miyazawa et al. |
| 2016/0006072 | A1* | 1/2016 | Cho ................. H01M 10/0459 429/138 |
| 2016/0028064 | A1 | 1/2016 | Choi et al. |
| 2016/0036087 | A1 | 2/2016 | Na et al. |
| 2016/0380301 | A1 | 12/2016 | Kosaka et al. |
| 2017/0125794 | A1 | 5/2017 | Zhao et al. |
| 2018/0076424 | A1 | 3/2018 | Kato |
| 2018/0090787 | A1 | 3/2018 | Makino et al. |
| 2018/0102568 | A1 | 4/2018 | Otohata |
| 2018/0205109 | A1 | 7/2018 | Cho et al. |
| 2018/0233725 | A1 | 8/2018 | Yasuda et al. |
| 2018/0233752 | A1 | 8/2018 | Herrmann et al. |
| 2018/0248219 | A1 | 8/2018 | Kim et al. |
| 2018/0294509 | A1 | 10/2018 | Liu et al. |
| 2018/0342722 | A1 | 11/2018 | Zeng et al. |
| 2019/0044177 | A1 | 2/2019 | Lee et al. |
| 2019/0051924 | A1 | 2/2019 | Kim et al. |
| 2020/0006733 | A1 | 1/2020 | Cho et al. |
| 2020/0127334 | A1 | 4/2020 | Pyo et al. |
| 2020/0185753 | A1 | 6/2020 | Kwon |
| 2020/0227787 | A1 | 7/2020 | Kang et al. |
| 2020/0227788 | A1 | 7/2020 | Chun et al. |
| 2020/0235434 | A1 | 7/2020 | Lee et al. |
| 2020/0335813 | A1 | 10/2020 | Oh et al. |
| 2021/0050616 | A1 | 2/2021 | Taguchi et al. |
| 2021/0104775 | A1 | 4/2021 | Ono et al. |
| 2021/0351431 | A1 | 11/2021 | Hwang |
| 2022/0006161 | A1 | 1/2022 | Kim et al. |
| 2022/0029246 | A1 | 1/2022 | Watanabe et al. |
| 2022/0393225 | A1 | 12/2022 | Kim et al. |
| 2023/0006262 | A1 | 1/2023 | Maruhashi et al. |
| 2023/0036396 | A1 | 2/2023 | Hosokawa et al. |

FOREIGN PATENT DOCUMENTS

| EP | 2856552 | B1 | 5/2016 |
| EP | 3905417 | A1 | 11/2021 |
| EP | 3985778 | A1 | 4/2022 |
| EP | 4027421 | A1 | 7/2022 |
| JP | S45-005056 | Y1 | 3/1970 |
| JP | H02046663 | A | 2/1990 |
| JP | H08138722 | A | 5/1996 |
| JP | 2002-208442 | A | 7/2002 |
| JP | 2002367628 | A | 12/2002 |
| JP | 2003-151615 | A | 5/2003 |
| JP | 2003201352 | A | 7/2003 |
| JP | 2005243455 | A | 9/2005 |
| JP | 2006032246 | A | 2/2006 |
| JP | 2008091192 | A | 4/2008 |
| JP | 2008282739 | A | 11/2008 |
| JP | 2009-218105 | A | 9/2009 |
| JP | 2009259719 | A | 11/2009 |
| JP | 2010199281 | A | 9/2010 |
| JP | 2012033275 | A | 2/2012 |
| JP | 2013149477 | A | 8/2013 |
| JP | 2013-254629 | A | 12/2013 |
| JP | 2015-141791 | A | 8/2015 |
| JP | 2015531989 | A | 11/2015 |
| JP | 2015532766 | A | 11/2015 |
| JP | 2016103425 | A | 6/2016 |
| JP | 2017-016946 | A | 1/2017 |
| JP | 2018-018712 | A | 2/2018 |
| JP | 2018-41703 | A | 3/2018 |
| JP | 2018510472 | A | 4/2018 |
| JP | 2018-532240 | A | 11/2018 |
| JP | 2018181843 | A | 11/2018 |
| JP | 2019153427 | A | 9/2019 |
| JP | 2019199028 | A | 11/2019 |
| JP | 2020145123 | A | 9/2020 |
| JP | 6844476 | B2 | 3/2021 |
| KR | 20080063523 | A | 7/2008 |
| KR | 20100051353 | A | 5/2010 |
| KR | 20110048132 | A | 5/2011 |
| KR | 101058786 | B1 | 8/2011 |
| KR | 101209010 | B1 | 12/2012 |
| KR | 20130132230 | A | 12/2013 |
| KR | 20140002718 | A | 1/2014 |
| KR | 20140022447 | A | 2/2014 |
| KR | 20140060797 | A | 5/2014 |
| KR | 20140062761 | A | 5/2014 |
| KR | 20140064405 | A | 5/2014 |
| KR | 20150016671 | A | 2/2015 |
| KR | 20150020667 | A | 2/2015 |
| KR | 20150022264 | A | 3/2015 |
| KR | 2015-0035079 | A | 4/2015 |
| KR | 20150034944 | A | 4/2015 |
| KR | 20150049892 | A | 5/2015 |
| KR | 20150050505 | A | 5/2015 |
| KR | 101531234 | B1 | 6/2015 |
| KR | 20150144183 | A | 12/2015 |
| KR | 101595621 | B1 | 2/2016 |
| KR | 20160054219 | A | 5/2016 |
| KR | 101643593 | B1 | 7/2016 |

(56) References Cited

FOREIGN PATENT DOCUMENTS

| | | |
|---|---|---|
| KR | 20160108116 A | 9/2016 |
| KR | 101704759 B1 | 2/2017 |
| KR | 101761720 B1 | 7/2017 |
| KR | 101784033 B1 | 10/2017 |
| KR | 2017-0124336 A | 11/2017 |
| KR | 20180006324 A | 1/2018 |
| KR | 101826894 B1 | 2/2018 |
| KR | 101838350 B1 | 3/2018 |
| KR | 20180037847 A | 4/2018 |
| KR | 20180061872 A | 6/2018 |
| KR | 20180128770 A | 12/2018 |
| KR | 101941144 B1 | 1/2019 |
| KR | 101963313 B1 | 3/2019 |
| KR | 20190054491 A | 5/2019 |
| KR | 20190056812 A | 5/2019 |
| KR | 20190064977 A | 6/2019 |
| KR | 101995038 B1 | 7/2019 |
| KR | 102044363 B1 | 11/2019 |
| KR | 20200023852 A | 3/2020 |
| KR | 20200023853 A | 3/2020 |
| KR | 20200023854 A | 3/2020 |
| KR | 20200036641 A | 4/2020 |
| KR | 20200061033 A | 6/2020 |
| KR | 20200067575 A | 6/2020 |
| KR | 20200069171 A | 6/2020 |
| KR | 20200094325 A | 8/2020 |
| KR | 20200095896 A | 8/2020 |
| KR | 102164576 B1 | 10/2020 |
| KR | 20200145375 A | 12/2020 |
| KR | 20210033327 A | 3/2021 |
| KR | 102253132 B1 | 5/2021 |
| KR | 20210049297 A | 5/2021 |
| KR | 20210051155 A | 5/2021 |
| KR | 20210051164 A | 5/2021 |
| KR | 102256438 B1 | 6/2021 |
| KR | 102265741 B1 | 6/2021 |
| KR | 20210074026 A | 6/2021 |
| KR | 20210135861 A | 11/2021 |
| WO | 2006120959 A1 | 11/2006 |
| WO | 2016-152922 A1 | 9/2016 |
| WO | 2017018456 A1 | 2/2017 |
| WO | 2018116295 A1 | 6/2018 |
| WO | 2019188719 A1 | 10/2019 |
| WO | 2021/131879 A1 | 7/2021 |

OTHER PUBLICATIONS

International Search Report for Application No. PCT/KR2022/010006 dated Nov. 4, 2022, pp. 1-3.
International Search Report for Application No. PCT/KR2022/010001 mailed Nov. 8, 2022, pp. 1-3.
International Search Report for Application No. PCT/KR2022/010005 mailed Nov. 8, 2022, pp. 1-3.
International Search Report for Application No. PCT/KR2022/010007 mailed Oct. 28, 2022, pp. 1-3.
International Search Report for Application No. PCT/KR2022/010008 mailed Nov. 4, 2022, pp. 1-3.
International Search Report for Application No. PCT/KR2022/010009 mailed Nov. 4, 2022, pp. 1-3.
Written Opinion of the ISA for PCT/KR2022/010000 mailed Oct. 26, 2022. 4 pgs.
Written Opinion of the ISA for PCT/KR2022/010003 mailed Nov. 2, 2022. 3 pgs.
Written Opinion of the ISA for PCT/KR2022/010004 mailed Oct. 26, 2022. 4 pgs.
Notice of Preliminary Rejection for Korean Application No. 10-2022-0084662 dated Jan. 1, 2023. 8 pgs.
Extended European Search Report including Written Opinion for Application No. 22838071.3 dated Jun. 24, 2024, pp. 1-8.
Extended European Search Report for Application No. 22838066.3 dated Aug. 5, 2024, pp. 1-5.

* cited by examiner (a)

(b)

(a)

(b)

(c)

ASSEMBLY MANUFACTURING EQUIPMENT AND METHOD FOR ELECTRODE ASSEMBLY

CROSS-REFERENCE TO RELATED APPLICATIONS

This application claims priority from Korean Patent Application No. 10-2021-0090590 filed on Jul. 9, 2021, Korean Patent Application No. 10-2021-0090596 filed on Jul. 9, 2021, Korean Patent Application No. 10-2021-0090588 filed on Jul. 9, 2021, Korean Patent Application No. 10-2021-0090589 filed on Jul. 9, 2021, Korean Patent Application No. 10-2021-0090591 filed on Jul. 9, 2021, Korean Patent Application No. 10-2021-0090592 filed on Jul. 9, 2021, Korean Patent Application No. 10-2021-0090597 filed on Jul. 9, 2021, Korean Patent Application No. 10-2021-0090598 filed on Jul. 9, 2021, Korean Patent Application No. 10-2021-0090600 filed on Jul. 9, 2021, and Korean Patent Application No. 10-2021-0090601 filed on Jul. 9, 2021, the entire contents of all of which are incorporated herein by reference.

TECHNICAL FIELD

The present disclosure relates to an electrode assembly manufacturing device and a process for manufacturing an electrode assembly. More particularly, the present disclosure relates to an electrode assembly manufacturing device and process for manufacturing an electrode assembly for reducing the dimensions of a separator of an electrode assembly to increase an electrode density of the electrode assembly.

BACKGROUND

Secondary batteries, unlike primary batteries, are rechargeable and have been widely researched and developed in recent years due to their small size and large capacity. As technology development and demand for mobile devices increase, the demand for secondary batteries as an energy source is rapidly increasing.

The secondary battery is classified into a coin-type battery, a cylindrical battery, a prismatic battery, and a pouch-type battery according to a shape of a battery case. In a secondary battery, an electrode assembly mounted inside a battery case is a chargeable/dischargeable power generating element having a stacked structure of an electrode and a separator.

The electrode assembly may be generally classified into a jelly-roll type in which a separator is interposed between a positive electrode and a negative electrode of a sheet type coated with an active material and wound, a stack type in which pluralities of positive and negative electrodes are sequentially stacked with a separator interposed therebetween, and a stack-and-folding type in which stacked unit cells are wound with a long-length separation film.

In a process of manufacturing a stack-and-folding type electrode assembly in the related art, an electrode assembly was manufactured by heating and pressing a stack in which an electrode and a separator are stacked to bond the electrode and the separator. At this stage in the electrode assembly process, the separator is folded but the electrode is externally exposed.

By heating and stacking the electrode and the separator in order to overcome certain deficiencies of conventional electrode assemblies, each layer is stacked and pressed so that the layers are bonded simultaneously with their stacking, and an outer portion of the separator is wrapped around the outermost portion of the stack of the electrode and the separator such that the stack is surrounded by the outer portion of the separator to thereby form an electrode assembly.

However, in this electrode assembly, a space is formed between the side portion of the separator positioned on a side of the electrode assembly and a portion of the electrode on the side of the electrode assembly due to the separator surrounding the outermost portion of the stack, so that the side separator portion of the electrode assembly includes wrinkles. This configuration leads to an undesirable reduction in the energy density of the electrode assembly.

Therefore, there is a need to address the space formed between the side portion of the separator and the portion of the electrode on the side of the electrode assembly.

SUMMARY OF THE DISCLOSURE

The present disclosure provides for an electrode assembly manufacturing apparatus and a process for manufacturing an electrode assembly in which such apparatus and process may be configured for fabricating an electrode assembly in a condensed form relative to prior electrode assemblies. In particular, an electrode assembly may be condensed relative to prior electrode assemblies by heating and pressing a stack of a first electrode, a second electrode, and a separator between the first and the second electrodes to decrease a width of the electrode assembly.

In one aspect, an electrode assembly manufacturing apparatus may include a stack table, a separator supply unit, a first electrode supply unit, a second electrode supply unit, and a side sealing device. A first electrode, a separator, and a second electrode may be stacked in a stack on the stack table in which the first electrode and the second electrode are disposed between sections of a folded separator. The separator supply unit may be configured for supplying the separator to the stack table. The first electrode supply unit may be configured for supplying the first electrode to the stack table and may be further configured for stacking the first electrode over the stack table. The second electrode supply unit may be configured for supplying the second electrode over the stack table and may be further configured for stacking the second electrode over the stack table. The side sealing device may be configured for heating at least one side surface of the stack.

In some arrangements, the side sealing device may include a pair of heating bars. The pair of heating bars may include heating surfaces that face towards each other. The pair of heating bars may be moved towards each other to compress the side surface or the side surfaces of the stack.

In some arrangements, the electrode assembly manufacturing apparatus further may include a press unit. The press unit may be configured for compressing the stack and further may be configured for heating the stack. In some arrangements, the press unit may be configured to compress and to heat up the stack simultaneously. In some other arrangements, the press unit may be configured to heat up the stack prior to compressing the stack while in still other arrangements, the press unit may be configured to heat up the stack prior to and during the compressing of the stack.

In some arrangements, the side sealing device may compress the stack in a direction perpendicular to a pressing direction of the press unit.

In some arrangements, the press unit may include a pair of pressing blocks. The pair of pressing blocks may face each other. The pair of pressing blocks may be moved towards each other to compress opposing upper and lower surfaces of the stack.

In some arrangements, each of the pair of pressing blocks may include a pressing surface. Each of the pressing surfaces may be configured for contacting opposing surfaces of the stack to compressing the stack such that the opposing surfaces of the stack define a plane.

In some arrangements, the press unit may include a press heater configured for heating the pair of pressing blocks.

In some arrangements, the pair of pressing blocks of the press unit may include a pressing surface that may define a plane. The pressing surface of the pressing block may have either one or both of a width that is longer than a width of the stack and a length that is longer than a length of the stack.

In some arrangements, the first electrode supply unit may include a first electrode seating table and a first transfer head. The first electrode may be seated on the first electrode seating table before being stacked on the stack table. The first transfer head may be configured for temporary fixation of the first electrode such as when the first electrode is seated on the first electrode seating table and may be further configured for picking and placing of the first electrode in a stack on the stack table. In some such arrangements, the first transfer head may be a first suction head which may be configured for suctioning the first electrode to fix the first electrode to the first transfer head. In some such arrangements, the first suction head may include a vacuum device to provide the suctioning. In some arrangements, the second electrode supply unit may include a second electrode seating table and a second transfer head. The second electrode may be seated on the second electrode seating table before being stacked in a stack on the stack table. The second transfer head may be configured for temporary fixation of the second electrode such as when the second electrode is seated on the second electrode seating table. In some such arrangements, the second transfer head may be a second suction head which may be configured for suctioning the second electrode to fix the second electrode to the second transfer head. In some such arrangements, the second suction head may include a vacuum device to provide the suctioning.

In some arrangements, the electrode assembly manufacturing apparatus further may include a rotating unit for rotating the stack table. The first electrode supply unit may be located on one side of the rotating unit, and the second electrode supply unit may be located on the other side of the rotating unit. The rotating unit may rotate the stack table such that the top surface of the stack table faces towards the first transfer head when the first electrode is stacked in the stack The rotating unit may rotate the stack table such that the top surface of the stack table faces the second transfer head when the second electrode is stacked in the stack.

In some arrangements, the rotating unit may alternately rotate the stack table in a direction of the first electrode supply unit and a direction of the second electrode supply unit.

In another aspect, an electrode assembly is manufactured by a process. During a stacking operation of this process, a first electrode, a separator, and a second electrode may be stacked to form a stack. In some arrangements of this process, the first electrode and the second electrode may be alternately disposed between sections of the separator. The sections of the separator are formed by folding the separator in a zigzag manner. During a side sealing operation of this process, at least one side surface of the stack may be heated and thereby bond the first electrode, the separator, and the second electrode to a portion of the separator extending along the side surface of the stack.

In some arrangements of the process, during the side sealing operation, the side surface or the side surfaces of the stack may be compressed at a temperature of 100° C. to 200° C. for a time of 10 seconds or less.

In some arrangements of the process, the stack may be compressed along a direction the stack is stacked. In some such arrangements, the stack may be heated up. The stack may be heated up prior to, simultaneously with, or both prior to and simultaneously with the stack being compressed. In some arrangements, the press unit may be configured to compress and to heat up the stack simultaneously. In some other arrangements, the press unit may be configured to heat up the stack prior to compressing the stack while in still other arrangements, the press unit may be configured to heat up the stack prior to and during the compressing of the stack.

In some arrangements of the process, during the side sealing operation, the side surface or the side surfaces of the stack may be compressed at a pressure in a range from 0.1 MPa to 1.5 MPa.

In accordance with the electrode assembly manufacturing apparatus and the electrode assembly manufacturing process according to the present disclosure, it is to be understood that an electrode density and thereby an energy density of the electrode assembly may be increased over electrode assemblies known in the relevant art by condensing the electrode assembly. In some arrangements, a width of a stack of stacked components of the electrode assembly may be decreased in condensing the electrode assembly. In some such arrangements, the width of the stack may be decreased by heating and pressing the stack in which the stack may include first and second electrodes and a separator between the first and the second electrodes.

In some arrangements according to any of the foregoing, the electrode assembly may be manufactured with dimensions corresponding to an inner space of a pouch, e.g., for use in a pouch-type battery or an inner space of a can, e.g., for use in a cylindrical battery, in which the electrode assembly may be accommodated. In this manner, the size of the pouch or the can may be easily changed as desired without concern for the ability to fabricate the electrode assembly.

DETAILED DESCRIPTION

Where the specification states that a part "includes" a certain element or that a specific structure or shape is "characterized," unless otherwise stated, such terms do not mean that other components or other structures and shapes are excluded, and indeed other components, structures, and shapes may be included.

Since the arrangements described herein may be variously transformed, specific arrangements are presented and described in detail in the detailed description. However, the disclosure of such arrangements is not intended to limit the content of the invention according to those arrangements and should be understood to include all transformations, equivalents, and substitutes included in the spirit and scope of the present disclosure.

Hereinafter, examples of the present invention will be described in detail with reference to the drawings. However, the drawings are for illustrative purposes only, and the scope of the present invention is not limited or intended to be limited by the drawings.

Figure 1:
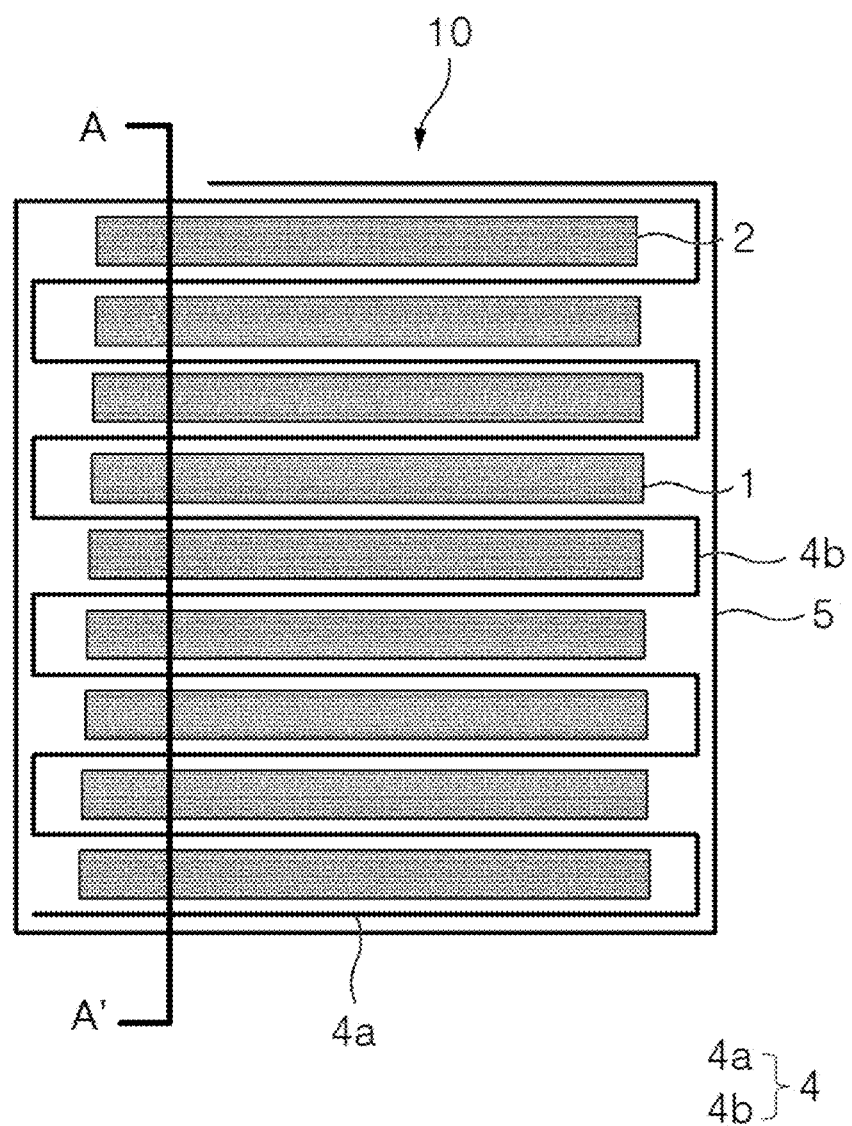
FIG. 1 is a cross-sectional elevation view illustrating an electrode assembly according to an exemplary embodiment.
Figure 2:
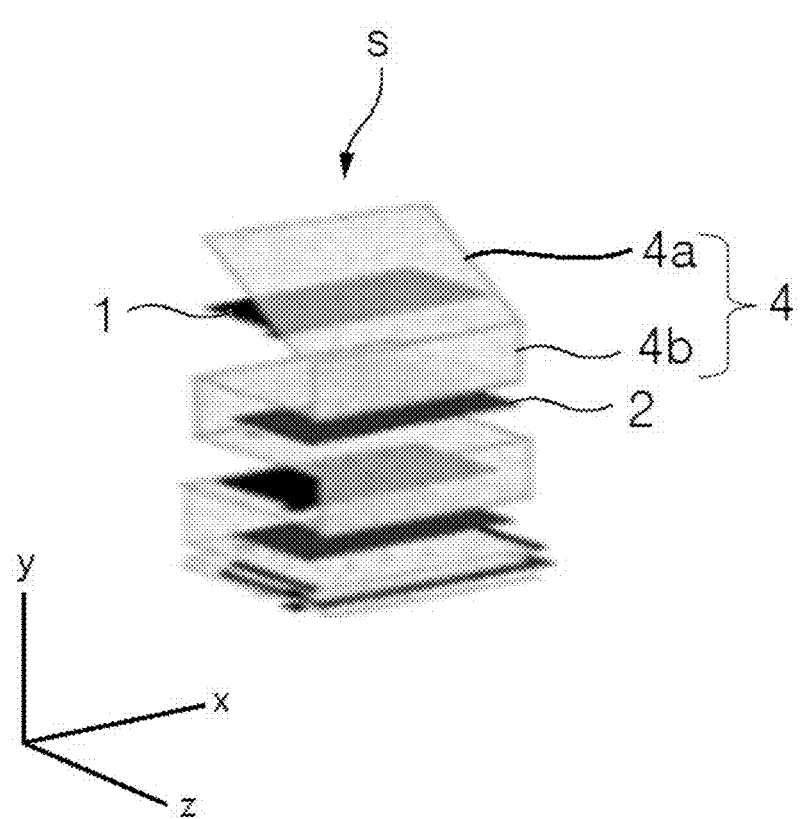
FIG. 2 is a perspective view illustrating a stack of the electrode assembly of FIG. 1.

Referring now to FIGS. 1 and 2, an electrode assembly 10 may include a stack S and a second separator 5 that may surround the stack S.

As shown, in the stack S, a first electrode 1 and a second electrode 2 may be alternately disposed between spacer sections 4a of first separator 4. As further shown, first separator 4 may be folded in a zigzag manner to form the spacer sections 4a.

Figure 3:
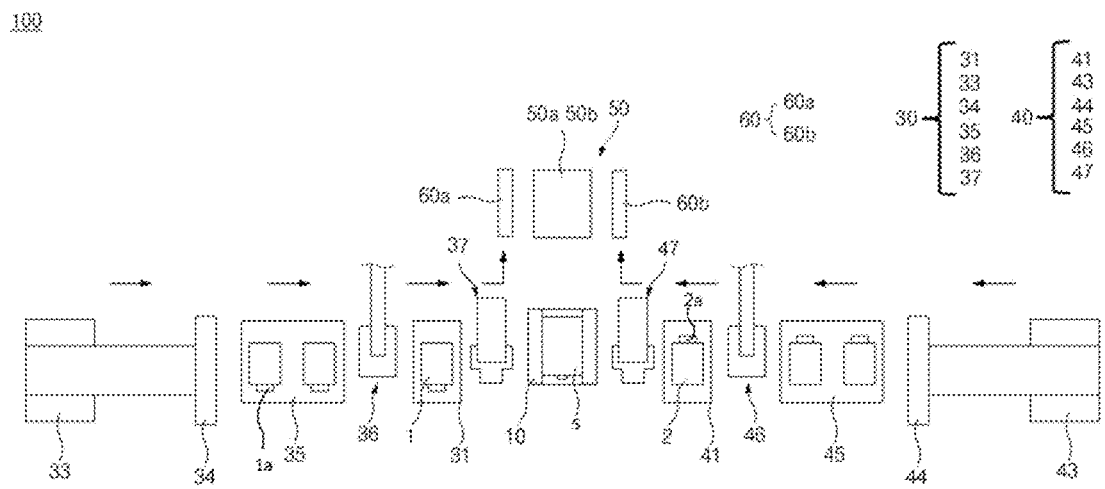
FIG. 3 is a plan view illustrating an electrode assembly manufacturing apparatus according to an exemplary embodiment.
Figure 4:
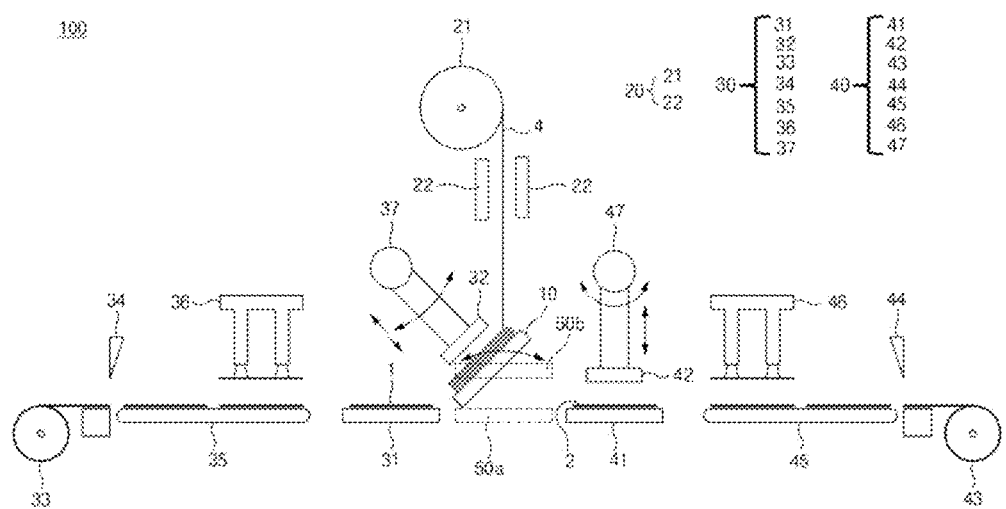
FIG. 4 is an elevation view illustrating the electrode assembly manufacturing apparatus of FIG. 3.
Figure 5:
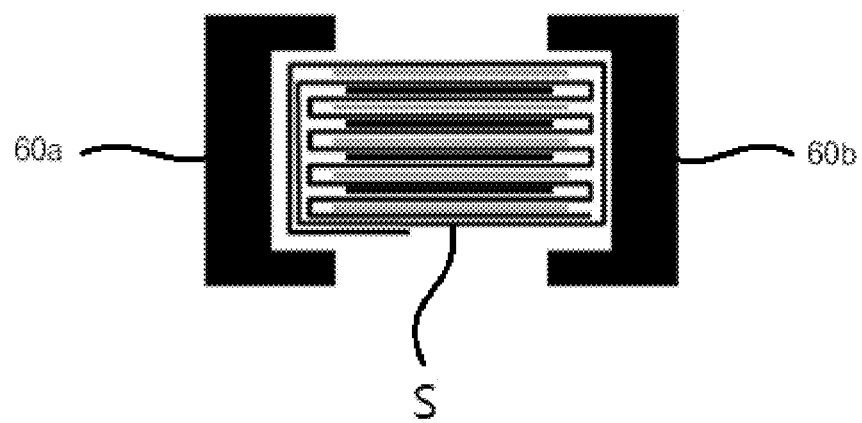
FIG. 5 is a cross-sectional view illustrating an electrode assembly within a side sealing device of the electrode assembly manufacturing apparatus of FIG. 3 according to an exemplary embodiment.

Referring to FIGS. 3-5, the electrode assembly manufacturing apparatus 100 includes a stack table 10, a separator supply unit 20, a first electrode supply unit 30, a second electrode supply unit 40, and a side sealing device 60.

The stack table 10 has one support surface on which a first combination of a first electrode 1, a first section of a separator 4, and a second electrode 2 are stacked in that order. A stacked stack S of further first electrodes 1, second electrodes 2, and additional sections of separator 4 placed between the first and the second electrodes is mounted on the first combination of the first electrode 1, the first section of the separator 4, and the second electrode 2. The separator 4 is folded in a zigzag manner to form the sections of the separator 4 and corresponding folds of the separator on opposite sides of each of the sections of the separator. In this manner, each section of the separator 4 is disposed between respective ones of the first electrodes 1 and respective ones of the second electrodes 2 within the stack S.

The stack table 10 is rotatable in one direction towards each first electrode 1 being supplied to allow the first electrode to be stacked on a respective section of the separator 4 supported by the stack table 10 and each prior stacked electrode and separator section, if any, and is rotatable in another direction opposite the one direction towards each second electrode 2 being supplied to allow the second electrode to be stacked on a respective section of the separator 4 supported by the stack table 10 and each prior stacked electrode and separator section. Accordingly, the electrode assembly manufacturing apparatus 100 may further include a rotating unit (not illustrated) for rotating the stack table 10. For more information regarding such a rotating unit, see Korean Patent Application Publication No. 10-2020-0023853, the entire contents of which are incorporated herein by reference.

In the electrode assembly manufacturing apparatus 100, the first electrode supply unit 30 is located on one side of the stack table 10, and the second electrode supply unit 40 may be located on the other side of the stack table. In the configuration of manufacturing apparatus 100 shown, the rotating unit may alternately rotate the stack table 10 in the direction of the first electrode supply unit 30 and the direction of the second electrode supply unit 40.

For example, the separator supply unit 20 may be located above the stack table 10, that is, along the stacking direction of the stack S. In this configuration, the first electrode supply unit 30 may be located at the left side of the stack table 10, and the second electrode supply unit 40 may be located on the right side of the stack table based on the stacking direction of the stack S.

In the configuration of manufacturing apparatus 100 shown, the rotating unit may rotate the stack table 10 so that the stack table faces a first transfer head 32, or other first attachment device for temporarily holding the first electrode 1, when stacking the first electrode 1. The rotating unit may rotate the stack table so that the stack table faces a second transfer head 42, or other second attachment device for temporarily holding the second electrode 2, when stacking the second electrode 2.

In using the electrode assembly manufacturing apparatus 100, a section of the separator 4 is supplied by the separator supply unit 20 and placed, and in some arrangements, mounted, onto the stack table 10. When the rotating unit rotates the stack table to the left, the first electrode 1 may be supplied from the first electrode supply unit 30 onto the supplied section of the separator 4. In addition, the rotating unit may rotate the stack table 10 to the right, in which such rotation may occur at the same time as the separator 4 is supplied. In this rotational configuration of the rotating unit, the separator 4 may form a first pocket in the form of a left pocket covering a lower surface, a right surface, and an upper surface of the first electrode 1 that is the first electrode of stack S placed over stack table 10 in which the upper surface of the first electrode may be covered by a section of the separator. In this configuration, the second electrode 2 may be supplied from the second electrode supply unit 40 and onto the section of the separator covering the upper surface of the first electrode 1.

When the above process is repeated, the separator 4 may be provided from the separator supply unit to overlie the stack table 10 in the forms of left pockets and right pockets oppositely configured to the left pockets. In such configurations, the left and the right pockets form alternating respective left and right openings as each section of the separator 4 is placed to overlie the stack table 10 in which such left and right openings are configured to receive the first electrodes 1 and the second electrodes 2, supplied by the first electrode supply unit and the second electrode supply unit 40, respectively. Further, side sections 4a of the separator 4, which may be in the form of folded parts when the separator 4 is folded (See FIG. 2), may be provided at positions facing the left and right openings. In some alternative arrangements, which may be a mirror arrangement to the arrangement of electrode assembly manufacturing apparatus 100, the separator 4 may form a first pocket in the form of a right pocket covering a lower surface, a left surface, and an upper surface of the second electrode 2. In such a mirror arrangement, the second electrode 2 may be the first electrode of stack S placed over stack table 10.

The stack table 10 may further include a table body (not illustrated) which determines a shape of the stack table 10 and a table heater (not illustrated), which for example may be a resistor coil on, under, or embedded within the table body. The table heater may heat up the table body and thereby heat up the stack S resting on the stack table 10.

The table heater may heat up the stack S prior to the stack S being heated and compressed by a first press unit 50 of the electrode assembly manufacturing apparatus 100. This preheating of the stack S by the table heater may reduce the press time needed for sufficient pressing by the first press unit 50 by shortening the time for heat conduction to the center of the stack S.

The first electrode 1 may be configured as a positive electrode, and the second electrode 2 may be configured as a negative electrode, but the electrode assembly manufacturing apparatus in accordance with the present disclosure is not limited to such a configuration, and for example, of course, the first electrode 1 may be configured as a negative electrode and the second electrode 2 may be configured as a positive electrode.

In some arrangements, the positive electrode may be manufactured by, for example, coating a positive electrode current collector with a positive electrode coating mixture comprising a positive electrode active material, a conductive material, and a binder and then drying the coating mixture. If necessary, a filler may be added to the mixture. Such materials may be any appropriate materials used in the relevant field, in particular those commonly used for the particular application.

For example, the positive electrode active material may include: layered compounds, such as lithium cobalt oxide ($LiCoO_2$) and lithium nickel oxide ($LiNiO_2$), or compounds substituted with one or more transition metals; lithium manganese oxides represented by the chemical formula $Li_{1+x}Mn_{2-x}O_4$ (where x is 0 to 0.33), such as $LiMnO_3$, $LiMn_2O_3$, and $LiMnO_2$; lithium copper oxide ($Li_2CuO_2$); vanadium oxides, such as $LiV_3O_8$, $LiFe_3O_4$, $V_2O_5$, and $Cu_2V_2O_7$; nickel (Ni) site-type lithium nickel oxides represented by the chemical formula $LiNi_{1-x}M_xO_2$ (wherein M=Co, Mn, Al, Cu, Fe, Mg, B, or Ga, and x=0.01 to 0.3); lithium manganese composite oxides represented by the chemical formula $LiMn_{2-x}M_xO_2$ (where M=Co, Ni, Fe, Cr, Zn, or Ta, and x=0.01 to 0.1) or $Li_2Mn_3MO_8$ (where M=Fe, Co, Ni, Cu, or Zn); $LiMn_2O_4$ in which a part of Li in the formula is substituted with an alkaline earth metal ion; disulfide compounds; and $Fe_2(MoO_4)_3$, but the positive electrode active material is not limited to such materials.

The materials that may be used for the positive electrode current collector are not particularly limited. The positive electrode current collector preferably has a relatively high conductivity without causing a chemical change when used in a battery. For example, stainless steel; aluminum; nickel; titanium; calcined carbon; or a material in which a surface of aluminum or stainless steel is treated with carbon, nickel, titanium, silver, and the like may be used. Preferably, the positive electrode current collector may be aluminum. Adhesion between the current collector and the positive electrode coating mixture desirably may be increased by including fine irregularities on a surface of the current collector interfacing with the coating mixture. Moreover, various structural configurations of the positive electrode current collector may be used, such as a film, a sheet, a foil, a net, a porous body, a foam body, and a non-woven body. The positive electrode current collector generally may have a thickness in a range from 3 μm to 500 μm.

The conductive material in the positive electrode coating mixture generally may be included in an amount from 1 to 50 wt % of the total weight of the mixture including the positive electrode active material. The conductive material is not particularly limited and preferably has a relatively high conductivity without causing a chemical change when used in a battery. For example, graphite, such as natural graphite and artificial graphite; carbon black, such as carbon black, acetylene black, Ketjen black, channel black, furnace black, lamp black, and summer black; conductive fibers, such as carbon fibers and metal fibers; carbon and metal powders, such as carbon fluoride, aluminum, and nickel powders; conductive whiskeys, such as zinc oxide and potassium titanate; conductive metal oxides, such as titanium oxide; and polyphenylene derivatives may be used for the conductive material.

The binder in the positive electrode coating mixture assists in bonding between the active material and the conductive material and in bonding the coating mixture to the current collector. Such a binder is generally included in an amount from 1 to 50% by weight of the total weight of the mixture including the positive electrode active material. Examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluororubber, and various copolymers.

The filler optionally added to the positive electrode coating mixture may be used as a component to suppress the expansion of the positive electrode. Such a filler is not particularly limited and may include a fibrous material that does not cause a chemical change when used in a battery. For example, olefin polymers, such as polyethylene and a polypropylene, and fibrous materials, such as glass fiber and carbon fiber, may be used.

In some arrangements, the negative electrode may be manufactured by coating, drying, and pressing a negative electrode active material on a negative electrode current collector, and, if necessary, the conductive materials, binders, fillers, and the like discussed above may be optionally further included. In any event, any appropriate materials used in the relevant field may be used, in particular those commonly used for the particular application. For example, as the negative electrode active material, carbon, such as non-graphitizable carbon and graphitic carbon; metal composite oxides represented by the chemical formulas $Li_xFe_2O_3$ ($0 \leq x \leq 1$), $Li_xWO_2$ ($0 \leq x \leq 1$), $Sn_xMe_{1-x}Me'yOz$ (Me: Mn, Fe, Pb, Ge; Me': Al, B, P, Si, elements of groups 1, 2 and 3 of the periodic table, and halogens; $0 < x \leq 1$; $1 \leq y \leq 3$; $1 \leq z \leq 8$); lithium metal; lithium alloys; silicon-based alloys; tin-based alloys; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers, such as polyacetylene; and Li—Co—Ni-based materials may be used.

The materials that may be used for the negative electrode current collector are not particularly limited. The negative electrode current collector preferably has a relatively high conductivity without causing a chemical change when used in a battery. For example, copper; stainless steel; aluminum; nickel; titanium; calcined carbon; a material in which a surface of copper or stainless steel is surface-treated with carbon, nickel, titanium, silver, and the like; and an aluminum-cadmium alloy may be used.

In addition, like the positive electrode current collector, the bond between the negative electrode current collector and the negative electrode active material may be strengthened by forming fine irregularities on the surface of the negative electrode current collector. Various structural configurations of the negative electrode current collector may also be used such as a film, a sheet, a foil, a net, a porous body, a foam body, a non-woven body, and the like. In addition, the negative electrode current collector may have a thickness generally in a range of 3 μm to 500 μm.

In some arrangements, the separator may be an organic/inorganic complex porous SRS (Safety-Reinforcing Separator). The SRS may have a structure in which a coating layer component including inorganic particles and a binder polymer is coated on a polyolefin-based separator substrate.

Since the SRS does not undergo high-temperature thermal contraction due to the heat resistance of the component inorganic particles, even if the electrode assembly is penetrated by a needle-shaped conductor, an elongated length of the safety separator can be maintained.

The SRS may have a uniform porous structure formed by an interstitial volume between the inorganic particles that are components of the coating layer, in addition to the porous structure of the separator substrate itself. The pores may not only significantly alleviate any external impacts applied to the electrode assembly but may also facilitate the movement of lithium ions through the pores, as well as enable a large amount of electrolyte to be impregnated into the separator, thereby promoting improved performance of the battery.

In some arrangements, the separator may be dimensioned in its width dimension (orthogonal to the longitudinal dimension in which the separator is unrolled) such that separator portions extend outwardly on both sides beyond corresponding edges of adjacent positive and negative electrodes (hereinafter "surplus portions"). Moreover, such outwardly extending portions of the separator may have a structure including a coating layer thicker than a thickness of the separator formed on one or both sides of the separator in order to prevent shrinkage of the separator.

For more information regarding the thicker coating layer on the outwardly extending surplus portions of the separator, see Korean Patent Application Publication No. 10-2016-0054219, the entire contents of which are incorporated herein by reference. In some arrangements, each separator surplus portion may have a size of 5% to 12% of the width of the separator. Moreover, in some arrangements, the coating layer may be coated on both surfaces of the separator over a width of 50% to 90% of the width of each separator surplus portion. In addition, the widths of the coating layers may be the same or different on each surface of the separator.

In some arrangements, the coating layer may include inorganic particles and a binder polymer as components.

In some arrangements, examples of the polyolefin-based separator component may include high-density polyethylene, linear low-density polyethylene, low-density polyethylene, ultra-high molecular weight polyethylene, polypropylene, or derivatives thereof.

In some arrangements, the thickness of the coating layer may be smaller than the thickness of the first electrode or the second electrode. In some such arrangements, the thickness of the coating layer may be 30% to 99% of the thickness of the first electrode or the second electrode.

In some arrangements, the coating layer may be formed by wet coating or dry coating.

In some arrangements, the polyolefin-based separator substrate and the coating layer may exist in a form in which pores on the surface of the substrate and the coating layer are anchored with each other, whereby the separator substrate and the coating layer may be bonded together firmly. The substrate and the coating layer of the separator may have a thickness ratio from 9:1 to 1:9. A preferred thickness ratio may be 5:5.

In some arrangements, the inorganic particles may be inorganic particles commonly used in the art. The inorganic particles may interact with each other to form micropores in the form of empty spaces between the inorganic particles while structurally helping to maintain the physical shape of the coating layer. In addition, since the inorganic particles generally have properties that do not change their physical properties even at high temperatures of 200° C. or more, the resultant organic/inorganic complex porous film generally and desirably has excellent heat resistance.

In addition, the materials that may be used for the inorganic particles are not particularly limited but are preferably electrochemically stable. That is, the inorganic particles are preferably selected such that oxidation and/or reduction reactions do not occur in the operating voltage range of the applied battery (for example, 0 to 5 V based on Li/Li+). In particular, the use of inorganic particles having ion transport ability may improve performance by increasing the ionic conductivity in the electrochemical device. Thus, use of inorganic particles having ionic conductivity as high as possible is preferable. In addition, when the inorganic particles have a high density, it is difficult to disperse the inorganic particles during coating, and it can also undesirably increase the weight of the battery. Therefore, use of inorganic particles having density as low as possible is preferable. In addition, inorganic materials having a high dielectric constant contribute to an increase in the degree of dissociation of electrolyte salt, such as a lithium salt, in a liquid electrolyte, thereby improving the ionic conductivity of the electrolyte.

For the above reasons, the inorganic particles may be at least one type selected from the group consisting of inorganic particles having piezoelectricity and inorganic particles having lithium-ion transport ability.

Inorganic particles having piezoelectricity refer to materials which are a nonconductor at normal pressure but have a property of conducting electricity due to a change in the internal structure when a certain pressure is applied. They are also materials which exhibit high permittivity characteristics with a permittivity constant of 100 or more. Inorganic particles having piezoelectricity also generate an electric potential difference between opposing surfaces, e.g., of a separator, by causing one surface to be positively charged and the other surface to be negatively charged, or vice versa, when either tension or compression is applied to an object composed of the inorganic particles, e.g., a separator.

When the inorganic particles having the above characteristics are used as a coating layer component, in the case of an internal short circuit of both electrodes due to an external impact, such as by a needle-shaped conductor, the positive electrode and the negative electrode may not directly contact one another due to the inorganic particles coated on the separator. Moreover, due to the piezoelectricity of the inorganic particles, an electric potential difference may occur within the particles, which desirably may result in electron movement between both electrodes (i.e., the flow of a minute current), so that it may be possible to gently reduce the voltage of the battery, thereby improving safety.

Examples of materials for the inorganic particles having piezoelectricity may be one or more selected from the group consisting of $BaTiO_3$, $Pb(Zr,Ti)O_3$ (PZT), those represented by the chemical formula $Pb_{1-x}La_xZr_{1-y}Ti_yO_3$ (PLZT), $PB(Mg_{3}Nb_{2/3})O_3$—$PbTiO_3$ (PMN-PT), and hafnia ($HfO_2$), but are not limited to these materials.

Inorganic particles having lithium-ion transport ability refer to inorganic particles containing a lithium element but not storing lithium and instead having a function of moving lithium ions. The inorganic particles having lithium-ion transport ability are capable of transporting and moving lithium ions due to a kind of defect in the particle structure. As a result, the lithium-ion conductivity in the battery may be improved, thereby improving battery performance.

Examples of materials for the inorganic particles having lithium-ion transport ability may be one or more selected from the group consisting of lithium phosphate ($Li_3PO_4$), lithium titanium phosphate (represented by the chemical formula $Li_xTi_y(PO_4)_3$, wherein $0<x<2$, $0<y<3$), lithium aluminum titanium phosphate (represented by the chemical formula $Li_xAl_yTi_z(PO_4)_3$, wherein $0<x<2$, $0<y<1$, glass of the series represented by the chemical formula $(LiAlTiP)_xO_y$ ($0<x<4$, $0<y<13$), lithium lanthanum titanate (represented by the chemical formula $Li_xLa_yTiO_3$, wherein $0<x<2$, $0<y<3$), lithium germanium thiophosphate (represented by the chemical formula $Li_xGe_yP_zS_w$, wherein $0<y<1$, $0<z<1$, $0<w<5$), lithium nitride (represented by the chemical formula $Li_xN_y$, wherein $0<x<4$, $0<y<2$), glass of the $SiS_2$ series (represented by the chemical formula $Li_xSi_yS_z$, wherein $0<x<3$, $0<y<2$, $0<z<4$), and glass of the $P_2S_5$ series (represented by the chemical formula $Li_xP_yS_z$, wherein $0<x<3$, $0<y<3$, $0<z<7$), but are not limited to these materials.

The composition ratio of the inorganic particles and the binder polymer, which are components of the coating layer of the separator, is not particularly limited, but may be adjusted within the range of 10:90 to 99:1 by weight %, and preferably within the range of 80:20 to 99:1 by weight %. When the composition ratio is less than 10:90 by weight %, the content of the polymer may become excessively large, and the pore size and porosity may be reduced due to a decrease in the empty space formed between the inorganic particles, finally resulting in deterioration of the battery performance. On the other hand, when the composition ratio exceeds 99:1 by weight %, the content of the polymer may be too small and the mechanical properties of the final organic/inorganic composite porous separator may become deteriorated due to weakened adhesive force between the inorganic materials.

In some arrangements, a binder polymer commonly used in the art may be used as the binder polymer.

The coating layer of the organic/inorganic composite porous separator may further include other commonly known additives in addition to the aforementioned inorganic particles and binder polymer.

In some arrangements, the coating layer may be referred to as an active layer.

Referring again to FIGS. 1 and 2, the first separator 4 may include a plurality of spacer sections 4a each positioned between the first electrode 1 and the second electrode 2 and side sections 4b each connected to and extending between sides of adjacent ones of the spacer sections 4a. As used herein, the side of the spacer section 4a refers to one side in a direction perpendicular to a stacking direction of the stack S. Accordingly, the side of the spacer section 4a is a position corresponding to the side of the stack S.

In the stack S, the side sections 4b may be alternately positioned on the side surfaces of respective layers of the stack. Adjacent spacer sections 4a and the side section 4b attached to such adjacent spacer sections 4a form an opening of the first separator 4a such that the side surfaces of the stack opposite the side sections 4b are defined by the first and the second electrodes received in the opening of the first separator. As such, the stack S may be alternately provided with the side sections 4b and the openings defined by the separator 4 on a pair of opposite side surfaces for each layer of the stack.

The first electrode 1 and the second electrode 2 may not be disposed in or on the side sections 4b.

As shown in the example of FIG. 1, the second separator 5 may be positioned on an upper surface, a lower surface, and at least one pair of opposing side surfaces of the stack S. That is, an end of the second separator 5 may be connected to an end of the first separator 4 and wound around the stack S at least once, as further shown in FIG. 1.

Accordingly, an inner separator surface of the second separator 5 positioned on a pair of opposing side surfaces of the stack S may face the side sections 4b. Additionally, the second separator 5 positioned on at least one pair of opposite side surfaces of the stack S may be in contact with at least one or more side sections 4b.

The electrode assembly 10 may be manufactured by heating or heating and compressing the side of the stack S when the second separator 5 is wound around and onto an outermost portion of the stack. For example, the electrode assembly 10 may be manufactured by heating or heating and compressing, by a side sealing device 60 (see FIG. 3 and related description further herein) including a pair of pressing blocks 60a and 60b, opposite side surfaces of the stack S when the second separator 5 is wound around and onto the outermost portion of the stack. Spaces formed between the side sections 4b positioned on both side surfaces of the stack S and the inner separator surface of the second separator 5 facing the side sections 4b may be condensed by thermally fusing one or more of the side sections and the inner separator surface. Such thermal fusion bonding of the side sections 4b and the second separator 5 may be achieved by heating and compressing the opposing side surfaces of the stack with the side sealing device 60 while the second separator 5 is wound on the outermost region of the stack S.

The electrode assembly 10 may be manufactured by heating and compressing any or all of an upper surface, a lower surface, and opposing side surfaces of a stack s in which a second separator 5 is wound around and onto the outermost portion of the stack. For example, the electrode assembly 10 may be manufactured by heating and compressing the upper surface and the lower surface of the stack S with a press unit 50 (see FIG. 3 and related description further herein) and, either separately or at the same time, heating and compressing the opposite side surfaces of the stack S with the side sealing device 60.

The press unit 50 may include a pair of heated pressing blocks 50a and 50b. Spaces between the first electrode 1, the first separator 4, and the second electrode 2 may be condensed by thermally fusing the upper and lower surfaces of the stack S to the inner separator surface of the second separator 5. Such thermal fusion bonding of the upper and lower surfaces with the second separator 5 may be achieved by heating and compressing the stack S with the pair of pressing blocks 50a and 50b while the second separator 5 is wound on the outermost region of the stack S. Here, the upper and lower surfaces of the stack S refer to the outer surfaces of the stack S positioned at the upper side and the lower side in the stacking direction.

Figure 6:
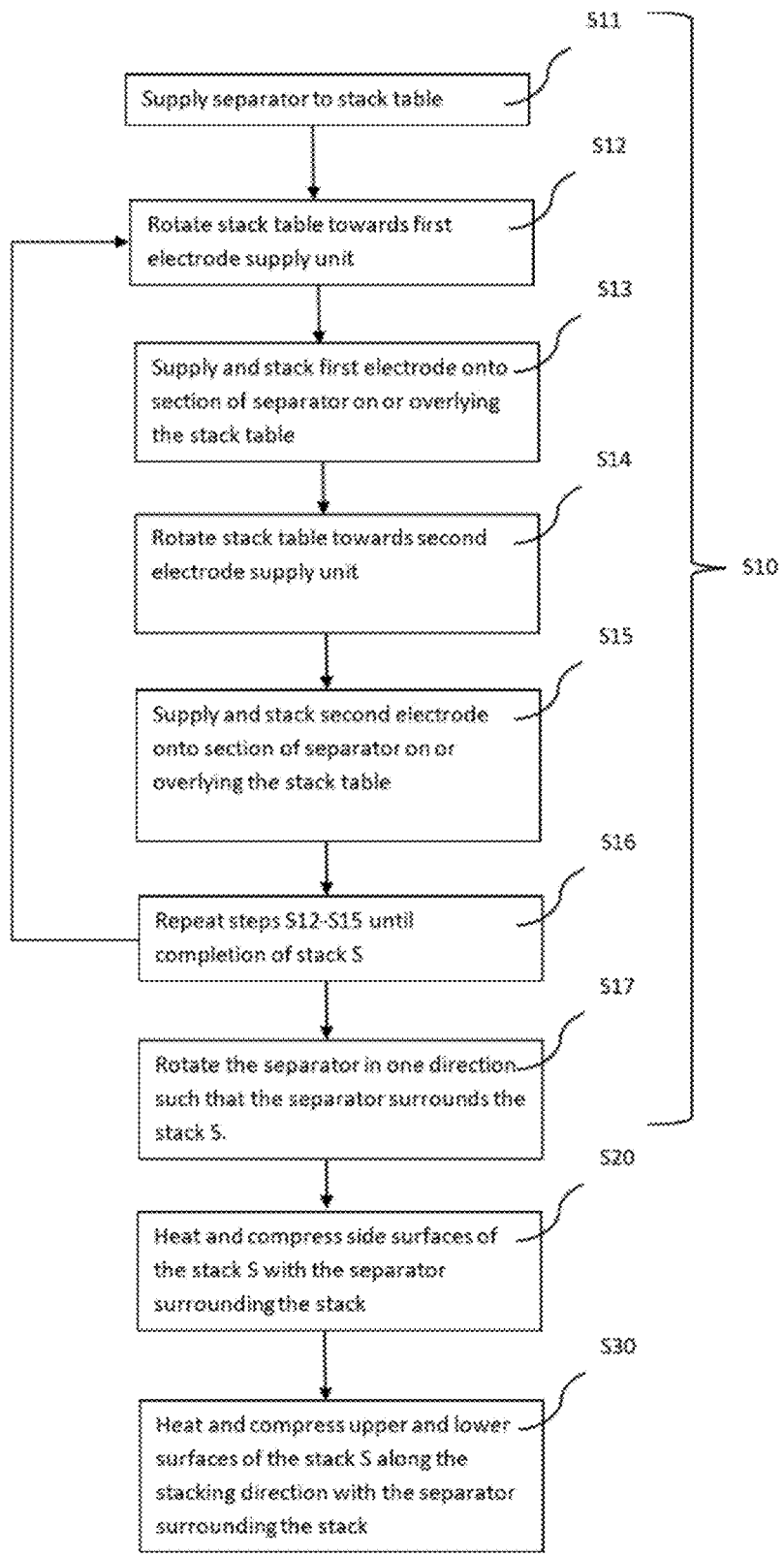
FIG. 6 is a process flow diagram of an electrode assembly manufacturing process according to an exemplary embodiment.

Accordingly, in the example of electrode assembly 10, the first electrode 1 and the first separator 4 and the first separator 4 and the second electrode 2 may be bonded to each other. In addition, as the upper and lower surfaces of the stack S are heated up and compressed, the side sections 4b may be compressed and adjacent ones of the side sections 4b may become thermally fused to each other. That is, two or more side sections 4b may be bonded to each other. In that regard, unlike the schematic representation illustrated in FIG. 1, the side sections 4b may extend outwardly past the ends of the electrodes 1, 2 by a relatively significant distance, as shown in the examples of FIGS. 5 and 6. In that manner, the side sections 4b can be deflected towards one another via any one or any combination of heating and compressing of the side sealing device 60 and press unit 50 and thereby bonded to each other.

In some arrangements, two or more bonded side sections 4b of the first separator 4 and the inner separator surface of the second separator 5 positioned so as to face the side sections 4b of the stack S may be bonded to each other.

In some arrangements, the side sections 4b may be bonded to the inner separator surface of the second separator 5 in a state in which adjacent ones of the side sections 4b are not bonded to each other. In that instance, a side section 4b may be bonded to the second separator 5 in a folded state without being bent in a direction parallel to the stacking direction of the stack S, or a side section 4b may be bent one or more times in either direction parallel to the stacking direction of the stack S while being bonded to the second separator 5.

A length of each side section 4b may be in a range from 0.1% to 1% based on 100% of the total length of the spacer section 4a to which the respective side section is attached. In that instance, the length of the side section 4b may refer a state in which the side section 4b is not bent.

If a length of a side section 4b exceeds 1% of the total length of the spacer section 4a to which the side section is attached, then the electrode density and energy density of the electrode assembly 10 may be reduced. Here, the total length of the spacer section 4a refers to the length from the side section 4b to the opening opposite the side section 4b.

In addition, the number of side sections 4b that are bonded to the inner separator surface of the second separator 5 may be 30% or more of the total number of side sections 4b. Preferably, the number of side sections 4b may be 40% or more, and more preferably, 50% or more.

Any side section 4b may be bonded to the inner separator surface of the second separator 5 in a state in which a plurality of adjacent side sections 4b are bonded to each other. An area of the second separator 5 that is bonded to any of the side sections 4b when adjacent ones of the side sections 4b of the first separator 4 are bonded to each other may be 30% or more of the total area of the second separator 5 positioned on one pair of opposite side surfaces of the stack S. Preferably, such area of the second separator 5 may be 40% or more, and more preferably, 50% or more.

In the electrode assemblies 10 in which the number of bonded side sections 4b and the bonding area between the side sections 4b and the second separator 5 are less than the foregoing 30% thresholds, a side surface of the stack S may have side sections 4b that are not sufficiently fixed. In this instance, it may not be easy to insert the electrode assembly 10 into a pouch or a can. Further, in the electrode assemblies 10 in which the number of bonded side sections 4b and the area of the second separator 5 do satisfy the foregoing 30% thresholds, the side section 4b may protrude from the sealed portion of a pouch, the electrode assembly may undesirably be sealed together with the pouch.

In addition, there are limits in minimizing the size of the pouch or the can because the difference between the size of the pouch or the can and the size of the electrode increases.

In some arrangements, when adjacent side sections 4b are bonded to each other, 50% or more of the total number of the side sections 4b may be bonded to each other. In some arrangements, widths of the first electrode 1 and the second electrode 2 may be provided to be smaller than the width of the stack S. In other words, the electrode assembly 10 may be positioned so that a side section 4b and the ends of the first electrode 1 and the second electrode 2 in layers adjacent to a layer of such side section 4b are not overlying or underlying each other. In that instance, the first electrode 1 or the second electrode 2 is not positioned between the adjacent side sections 4b such that the adjacent side sections 4b may be bonded to each other.

For example, when 10 side sections 4b are included in the electrode assembly 10 and 50% of the total number of side sections 4b are bonded to each other, the electrode assembly 10 may include a set of two of the side sections 4b that are bonded to each other, a set of three of the side sections 4b that are bonded to each other, and a set of five side sections 4b which are not bonded to their adjacent side sections 4b.

Referring again to FIGS. 3 and 4, as in the example of the electrode assembly manufacturing apparatus 100, separator supply unit 20 may be configured for supplying the separator 4 to the stack table 10. For more information regarding such a separator supply unit, see Korean Patent Application Publication No. 10-2020-0023853. For example, as shown in FIG. 4, the separator supply unit may be located above the stack table 10. In addition, the separator supply unit 20 may include a separator roll 21 on which the separator 4 may be wound. The separator 4 wound on the separator roll 21 may be supplied to the stack table 10 by gravity while being gradually loosened.

The separator supply unit 20 is formed with a passage through which the separator 4 passes. The separator supply unit 20 may include a separator heating unit (not illustrated) for heating the passing separator 4. For more information regarding such a separator heating unit, see Korean Patent Application Publication No. 10-2020-0023853.

The separator heating unit may include a pair of bodies (not illustrated) and a separator heater (not illustrated) for heating the body. The pair of bodies may be located on opposing sides of the separator 4 while being spaced apart from each other by a predetermined distance so as to allow the separator 4 to pass through. The separator 4 may, for example, pass through, while not being in contact with, the separator heating unit such that the separator 4 may be heated in a non-contact manner. In some arrangements, each body of the pair of bodies of the separator heating unit may be formed in, for example, a rectangular block shape.

As in the example of the electrode assembly manufacturing apparatus 100, the first electrode supply unit 30 may be configured for supplying the first electrode 1 to the stack table 10 and for stacking the first electrode 1 on the stack table 10. The first electrode supply unit 30 may include a first electrode seating table 31 on which the first electrode 1 is seated before being stacked on the stack table 10. Further, the first electrode supply unit 30 may include a first electrode roll 33, a first cutter 34, a first conveyor 35, and a first electrode supply head 36. In the first electrode supply unit 30, one of the first electrodes 1 may be supplied to the first electrode seating table 31 while a first electrode sheet from which the first electrodes 1 are formed wound around the first electrode roll 33 may be gradually unwound. The first cutter 34 may cut the first electrode 1 from the first electrode sheet supplied from the first electrode roll 33 to a preset length. The first cutter 34 may cut the first electrode sheet such that a first electrode tab 1a protrudes from an end of the first electrode 1.

The first electrode 1 cut by the first cutter 34 may be supplied to the first conveyor 35, and the first conveyor, which may be in the form of a belt as shown, may move the first electrode 1 to the first electrode seating table 31. The first electrode supply head 36 may pick up (e.g., via a vacuum fitting, suction cups or similar fitting, or other temporary form of attachment such as a magnetic attachment) the first electrode 1 placed on the first conveyor 35 and position the first electrode 1 on the first electrode seating table 31.

As further shown, the first electrode supply unit 30 may include a first transfer head 32 and a first moving unit 37 from which the first transfer head may extend and may be oscillated. The first transfer head 32 may pick up (e.g., via a vacuum fitting, suction cups or similar fitting, or other temporary form of attachment such as a magnetic attachment) the first electrode 1 seated on the first electrode seating table 31. In some arrangements, the first transfer head 32 may include a vacuum suction unit (not illustrated) on the bottom surface of the transfer head that may be configured for suctioning the first electrode 1 via a vacuum suction port to affix the first electrode 1 to the bottom surface of the first transfer head 32. A passage formed in the first transfer head 32 may connect the vacuum suction port and a vacuum suction device (not illustrated).

The first moving unit 37 may be configured for picking up the first electrode 1 seated on the first electrode seating table 10 and for moving the first transfer head 32 to a position overlying the stack table 10 where the transfer head 32 may release, e.g., by reducing or removing vacuum suction or other force being applied to the first electrode 1 to hold the first electrode against the transfer head. In this manner, the first transfer head 32 may transfer the first electrode 1 from the first electrode seating table 31 onto a section of the separator 4 resting on or overlying the stack table 10 via other electrodes 1, 2.

The second electrode supply unit 40 may have or may essentially have a mirror configuration of the first electrode supply unit 30. In this manner, the second electrode supply unit 40 may supply the second electrode 2 to a portion of the stack S resting, e.g., mounted, on the stack table 10 at that time and stack the second electrode 2 on such portion of the stack S on the stack table 10.

The second electrode supply unit 40 may include a second electrode seating table 41 on which the second electrode 2 is seated before being moved and stacked onto the portion of the stack S on the stack table 10.

The second electrode supply unit 40 may include a second electrode roll 43 around which a second electrode sheet from which the second electrode 2 is formed is wound, a second cutter 44 for cutting at regular intervals the second electrode sheet to form the second electrodes 2 in a predetermined size while unwinding the second electrode sheet from the second electrode roll 43, a second conveyor 45 for moving the second electrode 2 cut by the second cutter 44, and a second electrode supply head 46 for picking up the second electrode 2 moved by the second conveyor 45 and seating the second electrode 2 on the second electrode seating table 41.

Like the first cutter 34, the second cutter 44 may cut the second electrode sheet such that the formed second electrodes 2 each include a second electrode tab 2a protruding from an end of the second electrode 2.

Further, the second electrode supply unit 40 may include a second transfer head 42 for picking up the second electrode 2 seated on the second electrode seating table 41 and a second moving unit 47 configured for moving the second transfer head 42 to a position overlying the stack table 10 where the transfer head 42 may release, e.g., by reducing or removing vacuum suction or other force being applied to the second electrode 2 to hold the second electrode against the transfer head, so that the second transfer head 42 may stack the second electrode 2 onto a portion of the stack S on the stack table 10 at that time. The second transfer head 42 may be formed in the same manner as the first transfer head 32 such that the second electrode 2 may be temporarily affixed to the second transfer head 42 on a bottom surface of the second transfer head 42.

The side sealing device 60 may heat up at least one side surface of the stack S with the separator 4 surrounding the outermost portion of the stack. That is, the side sealing device 60 may apply heat to at least one side surface of the stack S to impart or increase adhesive force to a coating layer component applied to one surface of the separator 4 and facing towards the electrodes 1, 2.

The pressing direction of the side sealing device 60 may be perpendicular to the pressing direction of the press unit 50 described further herein.

In some arrangements, the side sealing device 60 may include a pair of heating bars 60a and 60b. The pair of heating bars 60a and 60b may be moved towards and away from each other and compress the stack S in a direction from the side and towards the center of the stack. That is, the side sealing device 60 may heat and compress the stack S from the side of the stack S.

The side surface of the stack S is a surface that includes the folded parts P of the stack S. Preferably, the side surface of the stack is not located on the same side of electrodes 1, 2 that electrode tabs 1a are located.

The stack S may include one or more sequentially stacked first electrodes 1, sections of separators 4, and second electrodes 2 in which an outermost portion of the separator 4 surrounds the outermost portion of the stack. The side sealing device 60 may heat and compress the side surface of the stack S and thereby the folded parts P included in the stack S by heating and compressing the outermost portion of the separator 4 (hereinafter, the outermost separator) surrounding the outermost portion of the stack S. Therefore, the side sealing device 60 may bond the plurality of folded parts P included in the stack S by heating and compressing the side surface of the stack S and thereby bond an inner surface of the outermost separator 4 to the folded parts P of the separator 4, the first electrode 1, and the second electrode 2 facing the inner surface of the outermost separator 4.

The electrode assembly manufacturing apparatus 100 may further include the press unit 50. The press unit 50 is heated for compressing of the stack S. Pressing of the press unit 50 may bond the first electrode 1, the separator 4, and the second electrode 2.

The press unit 50 may include a pair of pressing blocks 50a and 50b that may be located adjacent to top and bottom surfaces of the stack S. The pair of pressing blocks 50a and 50b may be moved in directions towards each other to compress the top and bottom surfaces of the S and then moved away from each other following such compression.

When the separator 4 is configured to surround the outer surface of the stack S, the space between inner surface portions of the outermost separator 4 and side portions of the first and second electrodes 1, 2 and the separator 4 facing the inner surface portions of the separator 4 may be bonded. In this configuration, the outermost separator 4 may include an upper surface, a lower surface, and two opposing side surfaces extending between the upper and the lower surfaces of the outermost separator 4 when surrounding the stack S.

Accordingly, when the electrode assembly 10 is formed by stacking the first electrode 1, the sections of the separator 4, and the second electrode 2, issue of the press unit 50 inhibits relative displacement of the first and second electrodes 1 and 2 and the separator 4 and thereby inhibits the stacking form from being undone.

The press unit 50 may further include a press heater (not illustrated) for heating the pair of pressing blocks 50a and 50b such that the pair of pressing blocks and 50b may heat up the stack S while compressing the stack. In this manner, when the stack S is compressed with the press unit 50, thermal fusion and thereby stronger bonds between each first electrode 1 and sections of the separator 4 adjacent to the first electrode and between the second electrode 2 and sections of the separator 4 adjacent to the second electrode may be better achieved.

As best shown in FIG. 4, each of the pair of pressing blocks 50a and 50b may be formed with a flat pressing surface in which either one or both of the lengths and the widths of the pressing surfaces may be formed to be longer than the corresponding lengths and widths of the stack S.

Further, the pair of pressing blocks 50a and may be provided as a quadrangular block in the form of a rectangular parallelepiped.

In some arrangements, the electrode assembly manufacturing apparatus 100 may further include a third moving unit (not illustrated) attached to and configured for rotating or otherwise moving a third transfer head (not illustrated). The third moving unit and the third transfer head may be the same as or similar to the first and second moving units 37, 47 and the first and the second transfer heads 32, 42, respectively.

In some arrangements, the third transfer head may suction the stack S seated on the stack table 10. The third transfer head may include a vacuum suction unit on a bottom surface to suction the stack S via the vacuum suction port and thereby temporarily affix the stack S to the bottom surface of the third transfer head. A passage connecting the vacuum suction port and the vacuum suction generation device may be formed in the third transfer head.

The third moving unit may be configured to move, e.g., via either one or both of translation and rotation, the third transfer head to the side sealing device 60 so that the stack S seated on the stack table 10 is movable to the side sealing device 60.

In some arrangements, the third transfer head may be temporarily affixed, in the manner described above, to the stack S when the stack is seated on the press unit 50. In such arrangements, the third moving unit may be configured to move, e.g., via either one or both of translation and rotation, the third transfer head to the side sealing device 60 so that the stack S seated on the press unit 50 is movable to the side sealing device 60.

Referring now to FIG. 6, an electrode assembly manufacturing process may include a stack manufacturing operation S10 and a side sealing operation S20.

In the stack manufacturing operation S10, a stack may be manufactured by supplying and stacking a first electrode, e.g., first electrode 1, a separator, e.g., separator 4, and a second electrode, e.g., second electrode 2, to an in-process stack on a stack table, e.g., stack table 10.

In a step S11 of the stack manufacturing operation S10, a section of the separator is supplied to the stack table. In some arrangements, this section of the separator is mounted to the stack table by a holding mechanism such as but not limited to a clamp or set of clamps or other clamping mechanism. In a step S12, the stack table is rotated in a direction towards a first electrode supply unit, e.g., first electrode supply unit 30 In a step S13, the first electrode is supplied and then stacked onto the separator section mounted or otherwise resting on the stack table. In a step S14, the stack table is rotated in a direction of a second electrode supply unit, e.g., second electrode supply unit 40, such that a further section of the separator folds onto and overlies the first electrode. In a step S15, the second electrode is supplied and then stacked onto a further section of the separator. In a step S16, the operations S12, S13, S14, and S15 are repeated to sequentially add one or more further first electrodes, sections of the separator, and one or more further second electrodes. In repeating the operation S12, a still further section of the separator folds onto and overlies the second electrode via rotation of the stack table before the next first electrode is supplied and then stacked onto that still further section of the separator. Via the alternating rotation of the stack table, the separator may be stacked in a zigzag manner between first and second electrodes.

In addition, in a step S17 of the stack manufacturing operation S10, the outermost portion of the stack may be surrounded by the separator by rotating the separator in one direction. Here, the outermost portion of the stack includes an upper surface, a lower surface, and both opposite side surfaces of the stack. Each of the side surfaces may extend in planes parallel to the stacking direction of the stack. Each of the side surfaces may exclude all surfaces on which an electrode tab, e.g., electrode tab 1a is located. The upper and lower surfaces of the stack each include a surface perpendicular to one or both of the side surfaces of the stack.

In the side sealing operation S20, at least one side surface of the stack may be heated. In this operation, one or both of the opposite side surfaces of the stack are heated and compressed to compress the stack. In this step, a pair of heating bars, e.g., heating bars 60a and 60b, may be pressed against the separator along the side surfaces of the stack for a time of 10 seconds or less while the heating bars are at a side sealing temperature of 100° C. to 200° C.

When the side sealing temperature is less than 100° C., sufficient adhesive forces may not be exhibited by a binder applied to the separator, and when the side sealing temperature exceeds 200° C., or when the pressing time exceeds 10 seconds, the increase in the adhesive effect may be insignificant compared to the energy supplied to heat the pair of heating bars.

In addition, during the side sealing operation S20, at least one side surface of the stack may be compressed at a pressure in a range from 0.1 MPa to 1.5 MPa. Preferably, the one or more side surfaces may be pressed at a pressure in a range from 0.1 MPa to 1 MPa and more preferably at a pressure in a range from 0.1 MPa to MPa.

That is, in the side sealing operation S20, both side surfaces of the stack may be compressed in directions perpendicular to the side surfaces and towards the center plane of the stack while heating both side surfaces of the stack at the same time.

When the pressure compressing the side surfaces of the covered stack satisfies the above-noted pressure range, damage to the first electrode and the second electrode may be prevented or at least inhibited by the contact and bonding of the outermost separator and the folded parts.

In a step S30, the electrode assembly manufacturing process may further include heating and compressing the stack. In this step, a pair of heated pressing blocks, e.g., the pair of pressing blocks 50a and 50b may compress the stack in a downward direction and optionally an upward direction towards the stack generally parallel to the side surfaces of the stack. Due to the heat conducted from the pair of pressing blocks, adhesive forces between the binder and the separator to which the binder is applied may be improved, and the separator and the first and second electrodes further may be bonded to each other by pressure.

Figure 7:
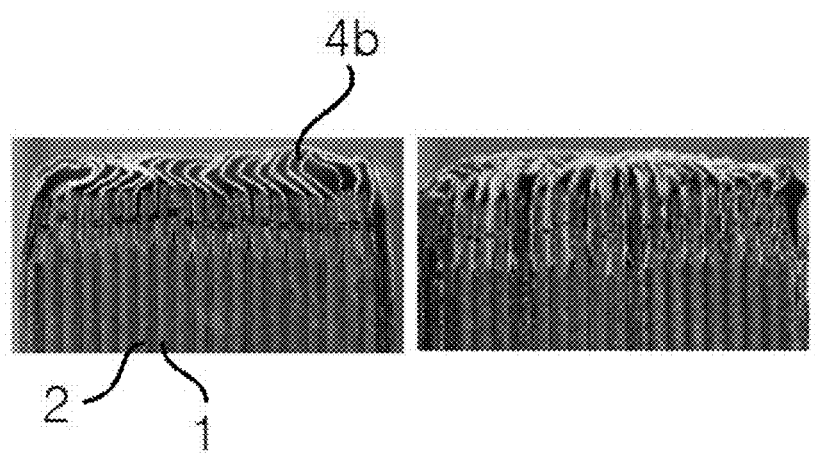
FIG. 7 is a pair of photographs of enlarged cross sections of an electrode assembly at approximately the location along lines A-A' of the electrode assembly according to FIG. 1 taken under an optical microscope.
Figure 8:
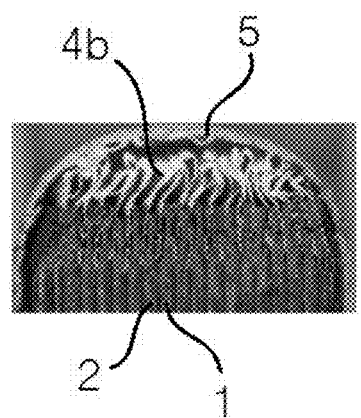
FIG. 8 is a pair of photographs of enlarged cross-sections of an electrode assembly taken with an optical microscope after cutting the cross-sections of Comparative Examples 1 and 2 as described further herein.
Figure 8:
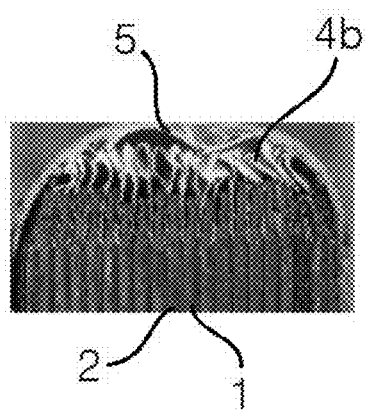
Figure 9:
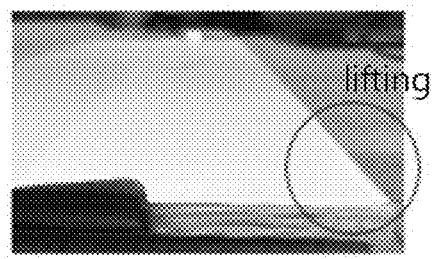
FIG. 9 is a set of photographs of an electrode assembly according to Comparative Example 3.
Figure 9:
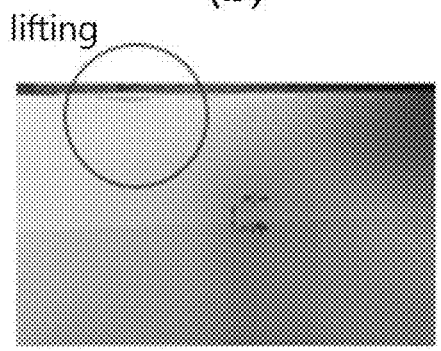
Figure 9:
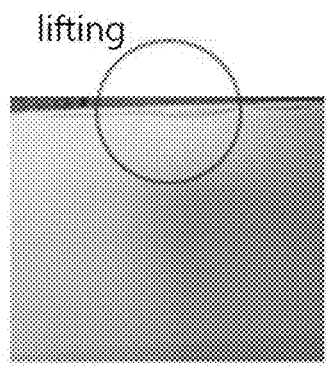

With reference to FIG. 7, each side section 4b may be bent one or more times in directions parallel to the stacking direction of the stack S. In this manner, in the electrode assembly 10 with the second separator 5 wound around the stack S, the distance between an end of the first electrode 1 and a portion of the inner separator surface of the second separator 5 facing the end of the first electrode 1 and the distance between an end of the second electrode 2 and a portion of the inner separator surface of the second separator 5 facing the end of the second electrode 2 are reduced such that the overall width of the electrode assembly 10 may be reduced.

The distance between the first electrode 1 or the second electrode 2 and a portion of the inner separator surface of the second separator 5 adjacent ends of the first electrode 1 or the second electrode 2 of the electrode assembly 10 may be reduced by 50% to 95% with a 100% reduction of the entire length of the side section 4b. The entire length of the side section 4b is the distance from the end of the first electrode 1 or the second electrode 2 to the end of the side section 4b that is in contact with the second separator 5 when the side section 4b is in an unbent state.

As the length of the side section 4b is reduced by 50% to 95% compared to the entire length of that side section 4b, a portion of that side section 4b in which the first electrode 1 and the second electrode 2 are not included is reduced, and thus the electrode density and the energy density of the electrode assembly 10 may be increased.

Wet adhesive force of the side section 4b of the electrode assembly 10 and the second separator 5 that is bonded to the side section 4b may be in a range from 40 gf/25 mm to 70 gf/25 mm.

Experimental Example

The following experiment was performed to measure the adhesion rate between the end of the side section and the inner separator surface of the outermost portion of the separator acting as the second separator of the stack included in the electrode assembly and the battery properties according to the adhesion area.

Example Process

The separator was folded in a zigzag shape, and a positive electrode and a negative electrode were alternately disposed between sections of the folded separator, and the outermost portion of the stack was surrounded with the separator for the manufacture of an electrode assembly. The electrode assembly according was manufactured by compressing the upper and lower surfaces of the stack by using the heated press unit to bond the entire stack and side sealing was performed by compressing both opposite side surfaces of the stack with the heated side sealing device.

Example 1

Example 1 includes an electrode assembly in which a side section of a separator is bonded to an area of 30% of the total area of an inner separator surface of a separator positioned on the side of a stack facing the side section by compressing the stack with a pressure of 0.15 MPa by using a side sealing device.

Example 2

Example 2 includes an electrode assembly in which a side section of a separator is bonded to an area of 80% of the total area of an inner separator surface of a separator positioned on the side of a stack facing the side section by compressing the stack with a pressure of 0.25 MPa by using a side sealing device.

Comparative Example 1

Comparative Example 1 includes an electrode assembly in which a stack was compressed to a pressure of MPa by using a side sealing device.

Comparative Example 2

Comparative Example 2 includes an electrode assembly in which a side section of a separator is bonded to an area of 20% of the total area of an inner separator surface of a separator positioned on the side of a stack facing the side section by compressing the stack with a pressure of 0.10 MPa by using a side sealing device.

Comparative Example 3

Comparative Example 3 includes an electrode assembly in which a side section of a separator is bonded to an area of 90% of the total area of an inner separator surface of a separator positioned on the side of a stack facing the side section by compressing the stack with a pressure of 0.30 MPa by using a side sealing device.

TABLE 1

| | Press unit | | | Side sealing | | |
|---|---|---|---|---|---|---|
| | Temperature (° C.) | Pressure (Mpa) | Time (s) | Temperature (° C.) | Pressure (Mpa) | Time (s) |
| Example 1 | 70 | 1.91 | 15 | 150 | 0.15 | 3 |
| Example 2 | 70 | 1.91 | 15 | 150 | 0.25 | 3 |
| Comparative Example 1 | 70 | 1.91 | 15 | 150 | 0.05 | 3 |
| Comparative Example 2 | 70 | 1.91 | 15 | 150 | 0.10 | 3 |
| Comparative Example 3 | 70 | 1.91 | 15 | 150 | 0.30 | 3 |

TABLE 2

| | Negative electrode damage | Degree of side sealing | Lifting of side separator |
|---|---|---|---|
| Example 1 | None | Good | No |
| Example 2 | None | Good | No |
| Comparative Example 1 | | Measurement impossible | |

TABLE 2-continued

|  | Negative electrode damage | Degree of side sealing | Lifting of side separator |
|---|---|---|---|
| Comparative Example 2 | None | Poor | No |
| Comparative Example 3 | None | Good | Yes |

Table 2 shows the results of measurements of the damage to the negative electrode of the electrode assembly, the degree of adhesion between the side section and the portion of the separator located on the side of the side section, and the degree of lifting of the outermost portion of the separator positioned on the side of the electrode assembly.

In this case, the degree of side sealing was observed visually by the degree of adhesion between the side section of the separator and the outermost portion of the separator acting as the second separator. The lifting of the second or side separator means that the second separator is pushed to the upper surface or the lower surface of the electrode assembly, and a part of the separator positioned on the upper surface and the lower surface of the electrode assembly does not adhere to the electrode.

Referring to Table 2, in Comparative Example 1, since the pressure applied by the side sealing device was low, the electrode assembly could not be compressed such that it was not possible to measure the damage to the negative electrode, the degree of side sealing, or the degree of lifting of the second separator.

In Comparative Example 2, it can be seen that although the side sealing device compresses the side surface of the electrode assembly, the second separator positioned on the side of the electrode assembly did not move to the side section due to low pressure such that the adhesion between the side section and the second separator was poor.

In Comparative Example 3, it can be seen that the pressure applied by the side sealing device to the side of the electrode assembly was large. As such, the second separator located on the side of the electrode assembly climbed up the anode and the anode pushed the separator positioned on the upper or lower surface of the electrode assembly. It can be confirmed visually that the separator positioned on the upper or lower surface of the electrode assembly is folded.

In the forgoing, the present invention has been described with reference to exemplary embodiments, but those skilled in the art may appreciate that the present invention may be variously modified without departing from the spirit and the scope of the present invention as set forth in the appended claims.

The invention claimed is:

1. An electrode assembly manufacturing apparatus for fabricating a stack comprising a first electrode, a second electrode, and a section of a separator between the first and the second electrodes, the apparatus comprising:
   a stack table configured for supporting the stack;
   a separator supply unit configured for supplying portions of a separator to the stack table;
   a first electrode supply unit configured for stacking the first electrode on the separator supported by the stack table;
   a second electrode supply unit configured for stacking the second electrode on the separator supported by the stack table; and
   a side sealing device for heating at least one side surface of the stack to bond either a portion of the separator separate from the section of the separator or a separate separator covering the side surface of the stack to the side surface of the stack.

2. The electrode assembly manufacturing apparatus of claim 1, wherein the side sealing device includes a pair of heating bars, and the pair of heating bars are moveable in directions towards each other to compress the side surface of the stack.

3. The electrode assembly manufacturing apparatus of claim 1, further comprising:
   a press unit configured for compressing the stack in directions parallel with the stacking direction.

4. The electrode assembly manufacturing apparatus of claim 3, wherein the press unit is further configured for heating the stack while compressing the stack.

5. The electrode assembly manufacturing apparatus of claim 3, wherein the side sealing device compresses the stack in a direction perpendicular to a pressing direction of the press unit.

6. The electrode assembly manufacturing apparatus of claim 3, wherein the press unit includes a pair of pressing blocks, and
   the pair of the pressing blocks are moved towards each other to compress the stack.

7. The electrode assembly manufacturing apparatus of claim 6, wherein each of the pair of the pressing blocks includes a pressing surface, and wherein each of the pressing surfaces is configured for contacting an opposing surface of the stack such that, upon compression of the opposing surfaces by the pressing surfaces, the opposing surfaces of the stack define a plane.

8. The electrode assembly manufacturing apparatus of claim 6, wherein the press unit includes a press heater configured for heating the pair of the pressing blocks.

9. The electrode assembly manufacturing apparatus of claim 6, wherein each of the pair of the pressing blocks of the press unit includes a pressing surface that defines a plane, and wherein the pressing surfaces of the pressing blocks have either one or both of a width that is longer than a width of the stack and a length that is longer than a length of the stack.

10. The electrode assembly manufacturing apparatus of claim 1,
    wherein the first electrode supply unit comprises:
    a first electrode seating table configured for seating the first electrode before the first electrode is stacked on the stack table; and
    a first transfer head configured for temporary fixation of the first electrode and for transferring the first electrode to an in-process stack on the stack table while the first electrode is temporarily fixed to the first transfer head, and
    wherein the second electrode supply unit comprises:
    a second electrode seating table configured for seating the second electrode before the second electrode is stacked on the stack table; and
    a second transfer head configured for temporary fixation of the second electrode and for transferring the second electrode to the in-process stack on the stack table while the second electrode is temporarily fixed to the second transfer head.

11. The electrode assembly manufacturing apparatus of claim 10, wherein the first transfer head and the second transfer head each include a vacuum device to which to temporarily fix the first and second electrodes, respectively.

12. The electrode assembly manufacturing apparatus of claim 10, further comprising:
a rotating unit for rotating the stack table,
wherein the first electrode supply unit is provided on a first side of the rotating unit and the second electrode supply unit is provided on a second side of the rotating unit opposite the first side, and
wherein the rotating unit rotates the stack table to the first side to face the first transfer head when the first electrode is stacked and rotates the stack table to the second side to face the second transfer head when the second electrode is stacked.

13. The electrode assembly manufacturing apparatus of claim 12, wherein the rotating unit is configured for alternately rotating the stack table in a direction of the first electrode supply unit and a direction of the second electrode supply unit.

14. An electrode assembly manufacturing method for manufacturing a stack, the electrode assembly manufacturing method comprising:

supplying and stacking a first electrode, a separator, and a second electrode to manufacture a stack of the first and the second electrodes with the separator disposed between the first and the second electrodes; and
heating at least one side surface of the stack to bond the first electrode and the second electrode to the separator.

15. The electrode assembly manufacturing method of claim 14, further comprising:
compressing the at least one side surface at a temperature of 100° C. to 200° C. for a time of 10 seconds or less.

16. The electrode assembly manufacturing method of claim 14, further comprising:
heating and compressing the stack in a direction along which the stack is stacked.

17. The electrode assembly manufacturing method of claim 14, further comprising compressing the at least one side surface of the stack at a pressure in a range from 0.1 MPa to 1.5 MPa.

* * * * *